US012706357B2

(12) United States Patent
Jiang

(10) Patent No.: US 12,706,357 B2
(45) Date of Patent: Aug. 11, 2026

(54) ELECTROCHEMICAL APPARATUS AND ELECTRONIC APPARATUS

(71) Applicant: Ningde Amperex Technology Limited, Ningde City (CN)

(72) Inventor: Jing Jiang, Dongguan City (CN)

(73) Assignee: NINGDE AMPEREX TECHNOLOGY LIMITED, Ningde City (CN)

(*) Notice: Subject to any disclaimer, the term of this patent is extended or adjusted under 35 U.S.C. 154(b) by 993 days.

(21) Appl. No.: 17/951,191

(22) Filed: Sep. 23, 2022

(65) Prior Publication Data

US 2023/0026628 A1 Jan. 26, 2023

Related U.S. Application Data

(63) Continuation of application No. PCT/CN2020/081185, filed on Mar. 25, 2020.

(51) Int. Cl.
*H01M 50/557* (2021.01)
*H01M 50/533* (2021.01)
(Continued)

(52) U.S. Cl.
CPC ....... *H01M 50/557* (2021.01); *H01M 50/533* (2021.01); *H01M 50/54* (2021.01); *H01M 50/548* (2021.01); *H01M 2220/30* (2013.01)

(58) Field of Classification Search
CPC ............. H01M 50/557; H01M 50/548; H01M 50/533; H01M 50/54
See application file for complete search history.

(56) References Cited

U.S. PATENT DOCUMENTS

2016/0181650 A1 6/2016 De
2016/0329546 A1 11/2016 Ham et al.
(Continued)

FOREIGN PATENT DOCUMENTS

CN 105283999 A 1/2016
CN 105474454 A 4/2016
(Continued)

OTHER PUBLICATIONS

International Search Report dated Dec. 29, 2020, issued in counterpart International Application No. PCT/CN2020/081185 (2 pages).
(Continued)

*Primary Examiner* — Karie O'Neill Apicella

(57) ABSTRACT

An electrochemical apparatus includes an electrode assembly. The electrode assembly includes a first electrode plate and a first tab group electrically connected to the first electrode plate, and an end of the electrode assembly includes a reusable region. The first electrode plate includes a first region located at an end of the first electrode plate and a second region connected to the first region, a thickness of the first region is less than a thickness of the second region, and the first region is disposed within the reusable region. The first tab group includes a first connecting portion located at an end of a first tab and a first bending portion connected to the first connecting portion and located on a side face of the electrode assembly, the first bending portion is disposed within the reusable region.

19 Claims, 8 Drawing Sheets

(51) Int. Cl.
*H01M 50/54* (2021.01)
*H01M 50/548* (2021.01)

(56) References Cited

U.S. PATENT DOCUMENTS

| | | | | |
|---|---|---|---|---|
| 2017/0214028 | A1* | 7/2017 | Oh | H01M 50/54 |
| 2017/0288201 | A1 | 10/2017 | Mimura | |
| 2018/0026254 | A1 | 1/2018 | Oh et al. | |
| 2019/0280280 | A1 | 9/2019 | Xiao et al. | |

FOREIGN PATENT DOCUMENTS

| | | | |
|---|---|---|---|
| CN | 205429098 | U | 8/2016 |
| CN | 106129319 | A | 11/2016 |
| CN | 107431232 | A | 12/2017 |
| CN | 207320217 | U | 5/2018 |
| CN | 209434285 | U | 9/2019 |
| JP | 2019-61878 | A | 4/2019 |
| KR | 10-2013-0119700 | A | 11/2013 |

OTHER PUBLICATIONS

Office Action dated May 7, 2022, issued in counterpart CN application No. 202080011314.5 (6 pages).
Extended (Supplementary) European Search Report dated May 24, 2025, issued in counterpart application No. 20926604.8. (9 pages).

* cited by examiner

ELECTROCHEMICAL APPARATUS AND ELECTRONIC APPARATUS

CROSS-REFERENCE TO RELATED APPLICATIONS

This application is a Continuation of International Application No. PCT/CN2020/081185, filed on Mar. 25, 2020, which is incorporated herein by reference in its entirety.

TECHNICAL FIELD

This application relates to the field of energy storage technologies, and in particular, to an electrochemical apparatus and an electronic apparatus using such electrochemical apparatus.

BACKGROUND

As electrochemical apparatuses are increasingly used in various fields, consumers have a growing demand for electrochemical apparatuses with high energy density. However, energy density of existing electrochemical apparatuses is still insufficient to meet the demand of consumers. To resolve the preceding issue, attempts have been made in the prior art to use space inside electrochemical apparatuses to increase energy density.

A secondary battery is used as an example of electrochemical apparatus. A secondary battery roughly includes a jelly-roll (jelly-roll) electrode assembly or a stacked electrode assembly. The jelly-roll electrode assembly has the following structure: a long plate-shaped positive electrode plate and a long plate-shaped negative electrode plate that are made from an active material are wound with a separator sandwiched between the positive electrode plate and the negative electrode plate. The stacked electrode assembly has the following structure: a plurality of positive electrode plates with predetermined dimensions and a plurality of negative electrode plates with predetermined dimensions are stacked in sequence, with a separator sandwiched between each positive electrode plate and a corresponding negative electrode plate. On the one hand, the jelly-roll (jelly-roll) electrode assembly with a plurality of tabs or the stacked electrode assembly with a plurality of tabs usually requires that the tabs should extend out of the electrode plates (positive electrode plate and negative electrode plate) for electric conduction and be bent over and over again inside the battery, thereby occupying relatively large internal space of the battery and reducing energy density. On the other hand, for a secondary battery with a plurality of tabs integrated with a plurality of current collectors, a thinned region is produced on the lead-out side of the tabs due to the preparation process, but too large gaps between the positive electrode plate, the separator, and the negative electrode plate in the thinned region result in poor interfacial contact, leading to increased risks of lithium precipitation.

Persons skilled in the art need to consider how to resolve the foregoing problems.

SUMMARY

This application is intended to resolve at least one of the foregoing technical problems in the prior art.

An embodiment of this application provides an electrochemical apparatus, including an electrode assembly. The electrode assembly includes a first electrode plate and a first tab group electrically connected to the first electrode plate, and an end of the electrode assembly includes a reusable region. The first electrode plate includes a first region located at an end of the first electrode plate and a second region connected to the first region, where a thickness of the first region is less than a thickness of the second region, and the first region is disposed within the reusable region. The first tab group includes a first connecting portion located at an end of a first tab and a first bending portion connected to the first connecting portion and located on a side face of the electrode assembly, where the first bending portion is disposed within the reusable region.

In the electrochemical apparatus of this application, the tab group is led out and bent toward a thinned region on a side face of the electrode assembly. The bent tab group compresses the reusable region. In this way, a gap between two adjacent electrode plates within the reusable region becomes smaller, thereby achieving better interfacial contact, improved kinetics, and reduced risks of lithium precipitation. In addition, space inside the electrochemical apparatus is better utilized for the electrode assembly, thereby increasing energy density.

Further, the electrode assembly further includes a second electrode plate and a second tab group electrically connected to the second electrode plate. The second electrode plate includes a third region located at an end of the second electrode plate and a fourth region connected to the third region, a thickness of the third region is less than a thickness of the fourth region, and the third region is disposed within the reusable region. The second tab group includes a second connecting portion located at an end of a second tab and a second bending portion connected to the second connecting portion and located on a side face of the electrode assembly, where the second bending portion is disposed within the reusable region. A plurality of first regions and a plurality of third regions compress each other in a thickness direction of the electrode assembly, which makes a gap between the first electrode plate and second electrode plate located within the reusable region smaller, thereby achieving better interfacial contact, improved kinetics, and reduced risks of lithium precipitation.

Further, the first bending portion and the second bending portion are located on two opposite side faces of the electrode assembly respectively. The first bending portion and the second bending portion being disposed on two different side faces that are opposite each other can further compress the portion of the electrode assembly within the reusable region, further increasing the energy density of the electrochemical apparatus.

Further, a length of the portion of the first electrode plate disposed within the reusable region is greater than a length of the portion of the second electrode plate disposed within the reusable region. This ensures adequate space for lithium deintercalated from the cathode during charging and discharging of the electrochemical apparatus to intercalate into the anode to prevent lithium precipitation, and also allows the reusable region to have a larger volume to accommodate larger first bending portions, second bending portions, or other elements.

Further, a width of the first region is not less than a length of the first bending portion. The first bending portion may be entirely disposed within the reusable region, improving internal space utilization of the electrochemical apparatus.

Further, in a thickness direction of the electrochemical apparatus, a thickness of the first bending portion is h1, a total thickness of the first regions is h3, and a total thickness of the second regions is h2, satisfying a relational expression: $h1 \leq (h2-h3)$. Such arrangement allows an internal space of the electrochemical apparatus to be fully used without increasing the thickness of the electrochemical apparatus, thereby increasing the energy density while keeping the outer surface of the electrochemical apparatus flat.

Further, the electrochemical apparatus further includes an adapting piece, where a first end portion of the adapting piece is electrically connected to the first bending portion, and the first end portion is not bent. The first end portion of the adapting piece is electrically connected to the first bending portion to lead out signals. The first bending portion is not bent, which can further reduce the thickness of the electrochemical apparatus, thereby increasing the energy density.

Further, the first bending portion and the first end portion are each provided with an insulation layer on the surface. The insulation layer can be configured to prevent electrolyte spill caused by welding burrs piercing an packaging film outside the electrode assembly or a short circuit caused by welding burrs piercing the separator.

Further, a thickness of the first end portion is h4 and the number of the first end portions is n4, satisfying a relational expression: $h4 \times n4 + h1 \leq (h2 - h3)$. Such arrangement can further utilize the internal space of the electrochemical apparatus and control the thickness of the electrochemical apparatus, thereby increasing the energy density while keeping the outer surface flat.

An electronic apparatus includes the foregoing electrochemical apparatus.

Figure 1:
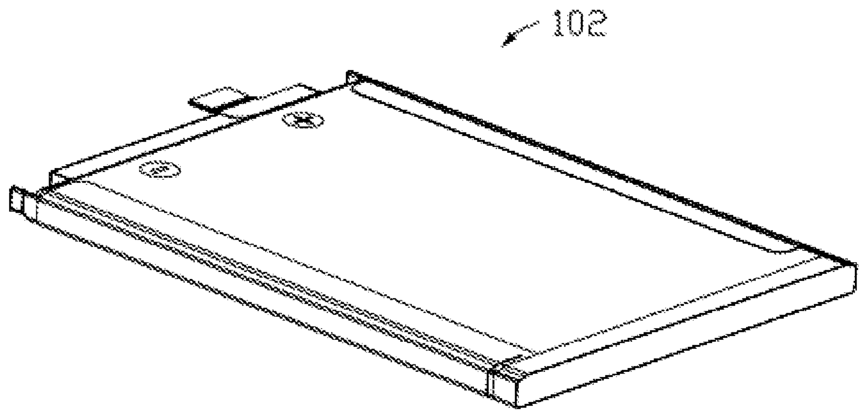
FIG. 1 is a stereoscopic schematic diagram of an electrochemical apparatus according to Embodiment 1 of this application.

Reference signs of main components:

| Component | Reference sign |
|---|---|
| Electronic apparatus | 1 |
| Body | 101 |
| Electrochemical apparatus | 102, 202, 302 |
| Electrode assembly | 10, 20 |
| First electrode plate | 11, 21 |
| First region | 111, 211 |
| Second region | 112, 212 |
| Second electrode plate | 12, 22 |
| Third region | 121, 221 |
| Fourth region | 122, 222 |
| First tab group | 13, 23 |
| First connecting portion | 131, 231 |
| First bending portion | 132, 232 |
| Second tab group | 14, 24 |
| Second connecting portion | 141, 241 |
| Second bending portion | 142, 242 |
| Adapting piece | 15, 25 |
| First end portion | 151, 251 |
| Insulation layer | 16, 26 |
| Reusable region | 19, 29 |

This application will be further described with reference to the accompanying drawings in the following specific embodiments.

DESCRIPTION OF EMBODIMENTS

The following more comprehensively describes content of this application with reference to the accompanying drawings. The accompanying drawings show exemplary embodiments of this application. However, this application may be implemented in many different implementations and should not be construed as being limited to the exemplary embodiments illustrated herein. These exemplary embodiments are provided to clearly and completely describe this application, and to fully convey the scope of this application to persons skilled in the art. Similar reference signs represent the same component or similar components.

Terms used herein are only for the purpose of describing specific exemplary embodiments, and are not intended to limit this application. As used herein, unless otherwise clearly stated in the context, singular forms "a/an", "one", and "the" also are intended to include plural forms. In addition, when used herein, the singular forms "include" and/or "contain" or "comprise" and/or "involve" or "have" and/or "possess" an integer, a step, an operation, a component, and/or an assembly, but do not exclude presence or addition of one or more other features, regions, integers, steps, operations, components, assemblies, and/or groups thereof.

Unless otherwise defined, all terms (including technical and scientific terms) used herein have the same meanings as those commonly understood by persons of ordinary skills in the art to which this application pertains. In addition, unless clearly defined herein, terms such as those defined in a general dictionary should be construed as having the same meanings as the terms in related technologies and content of this application, and shall not be construed as idealized or extremely formal meanings.

The following content describes the exemplary embodiments with reference to the accompanying drawings. It should be noted that components illustrated in the reference drawings are not necessarily shown to scale; and the same or similar reference signs or similar technical terms are used for the same or similar components.

The specific implementations of this application are further described in detail below with reference to the accompanying drawings.

Embodiment 1

FIG. 1 is a stereoscopic schematic diagram of an electrochemical apparatus 102 according to Embodiment 1 of this application. The electrochemical apparatus 102 includes an electrode assembly 10 (not shown in the figure). The electrochemical apparatus 102 is filled with an electrolyte (not shown in the figure) inside, and the electrolyte infiltrates the electrode assembly 10.

Figure 2:
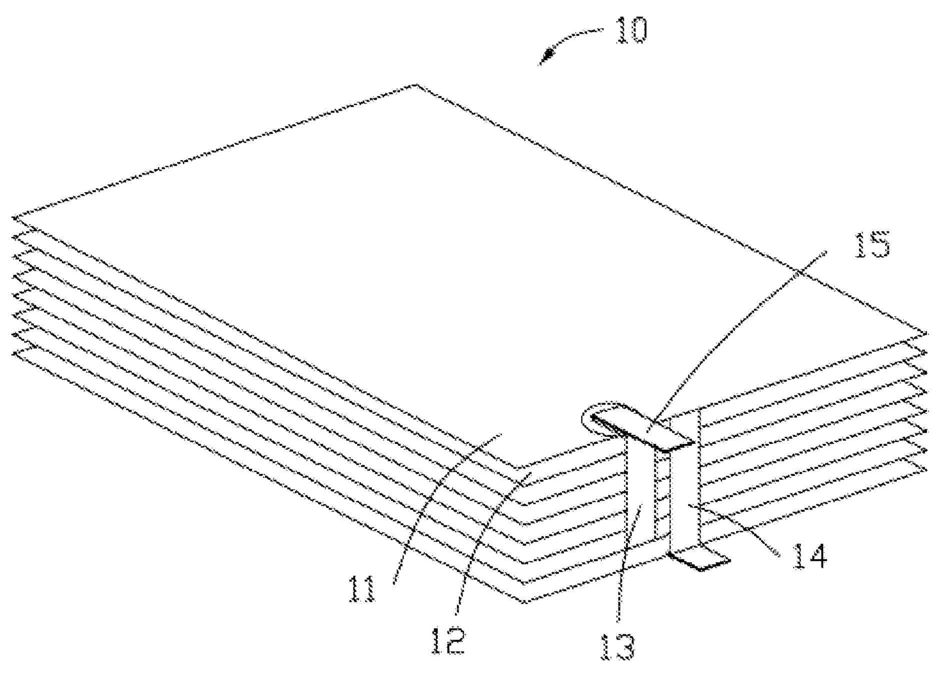
FIG. 2 is a stereoscopic schematic diagram of an electrode assembly of the electrochemical apparatus according to Embodiment 1 of this application.
Figure 3:
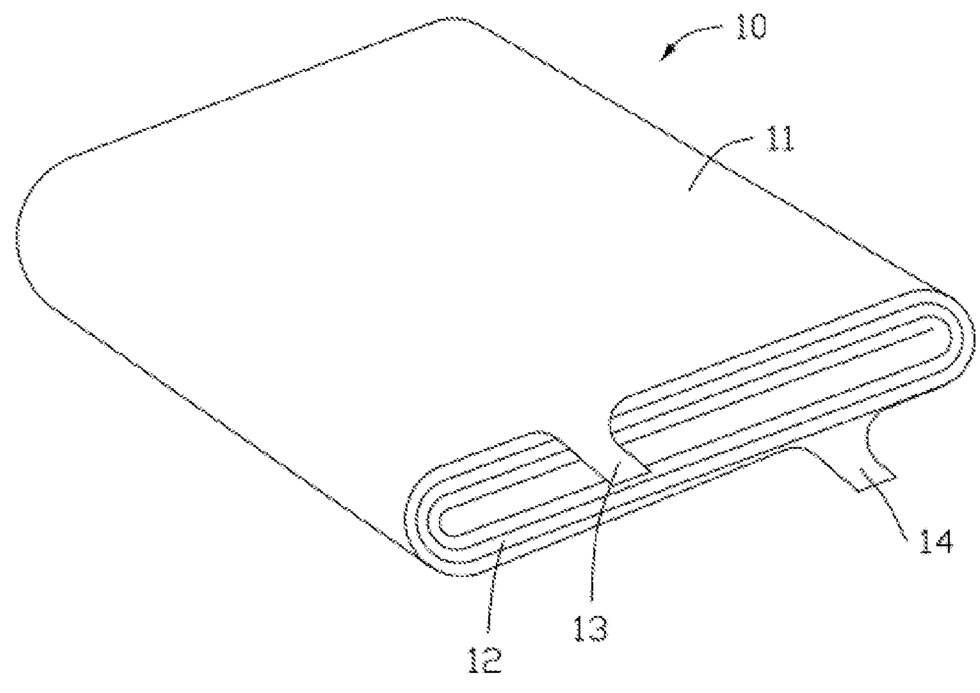
FIG. 3 is a stereoscopic schematic diagram of an electrode assembly of the electrochemical apparatus according to Embodiment 1 of this application.

FIG. 2 and FIG. 3 show an electrode assembly 10 provided in Embodiment 1 of this application. The electrode assembly 10 includes a first electrode plate 11 and a first tab group 13 connected to the first electrode plate 11. The electrode assembly 10 may further include a plurality of first electrode plates 11 and at least a separator configured to separate the plurality of first electrode plates 11.

In an embodiment, as shown in FIG. 2, the electrode assembly 10 is a stacked electrode assembly, and a plurality of first electrode plates 11 are spaced apart and stacked. In an embodiment, as shown in FIG. 3, the electrode assembly 10 is a wound electrode assembly. The first electrode plate 11 is wound, and a tab is disposed every half turn or every turn, which may be adjusted according to an actual rate requirement.

Figure 5:
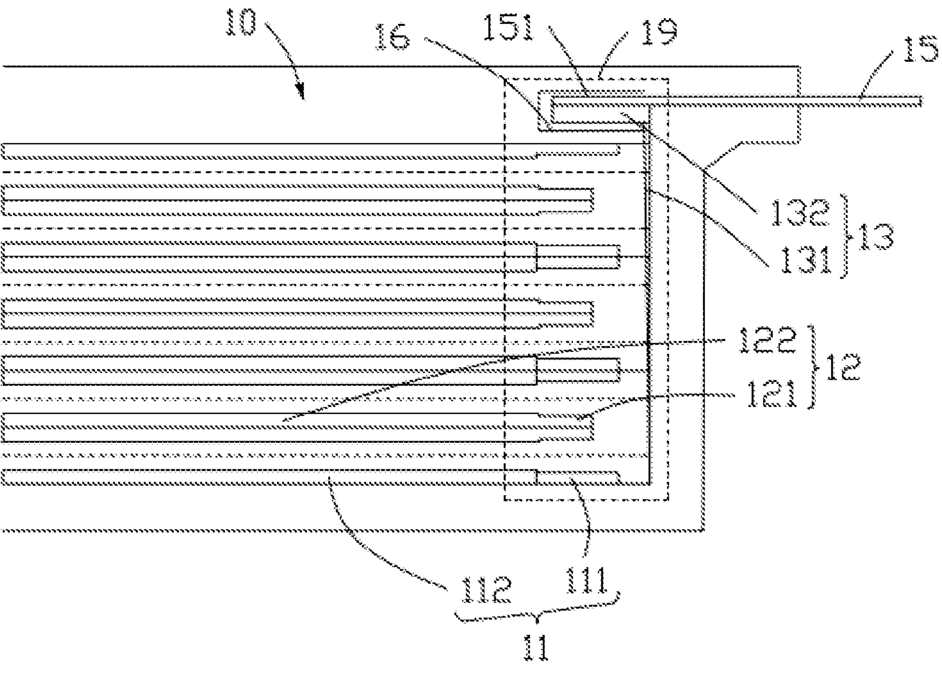
FIG. 5 is a schematic cross-sectional diagram of an electrode assembly of the electrochemical apparatus according to Embodiment 1 of this application.

As shown in FIG. 5, at least an end of the electrode assembly 10 includes a reusable region 19. The reusable region 19 is disposed at an end of the electrode assembly 10. The reusable region 19 includes at least a region of the electrode assembly 10 in which thinned portions of the electrode plates are stacked. The thinned portion is a portion located at an end of an electrode plate and has a thickness less than that of the other portion of the electrode plate. Thickness of the thinned portion may gradually decrease or increase in a direction perpendicular to a thickness direction of the electrode plate.

The first electrode plate 11 includes a first region 111 located at an end of the first electrode plate 11 and a second region 112 connected to the first region 111, where a thickness of the first region 111 is less than a thickness of the second region 112, and the first region 111 is disposed within the reusable region 19. That is, the first region 111 is the thinned region.

It should be understood that, during preparation of electrode plate, when an active substance is applied, because most slurries are in liquid state and therefore have fluidity, places close to where tabs extend out are thinner due to a smaller amount of active substance.

In an embodiment, the first regions 111 of the first electrode plates 11 compress each other in a thickness direction of the electrode assembly 10, which makes gaps between the electrode plates located within the reusable region 19 smaller, thereby achieving better interfacial contact, improved kinetics, and reduced risks of lithium precipitation. The thickness direction is a direction of the smallest side of the electrochemical apparatus 102 or electrode assembly 10.

The first tab group 13 includes a first connecting portion 131 located at an end of the first electrode plate 11 and a first bending portion 132 connected to the first connecting portion 131 and located on a side face of the electrode assembly 10 (that is, the largest face of the electrode assembly 10). The first bending portion 132 is disposed within the reusable region 19.

In an embodiment, the first tab group 13 includes a plurality of first tabs, and each of the first tabs may be formed by one current collector of the first electrode plate 11 extending outward. To be specific, the first tab may be formed by the first region 111 of the first electrode plate 11 extending in a direction leaving the second region 112.

In an embodiment, the first tab group 13 is bent once and arranged on an end face of the electrode assembly 10 in the same direction, and this portion is the first connecting portion 131. The first tab group 13 extends along the end face of the electrode assembly 10 to the side face of the electrode assembly 10 and is bent toward the side face, and this portion is the first bending portion 132.

In this application, the first tab group 13 only needs to be bent for a minimum of two times during arrangement. The times of bending the first tab group 13 are reduced, thereby avoiding possible fracture of the first tab group 13 caused by multiple times of bending, and improving reliability of the first tab group 13. In addition, the first bending portion 132 is located on the side face of the electrode assembly 10, which reduces the space occupied at the tab side of the electrode assembly 10 and increases the energy density.

In an embodiment, the electrode assembly 10 further includes a second electrode plate 12 and a second tab group 14 connected to the second electrode plate 12. The electrode assembly 10 may further include a plurality of second electrode plates 12, each of the first electrode plates 11 is adjacent to one second electrode plate 12 without contact, each of the second electrode plates 12 is adjacent to one first electrode plate 11 without contact, and a separator may be sandwiched between one first electrode plate 11 and one second electrode plate 12.

Figure 4:
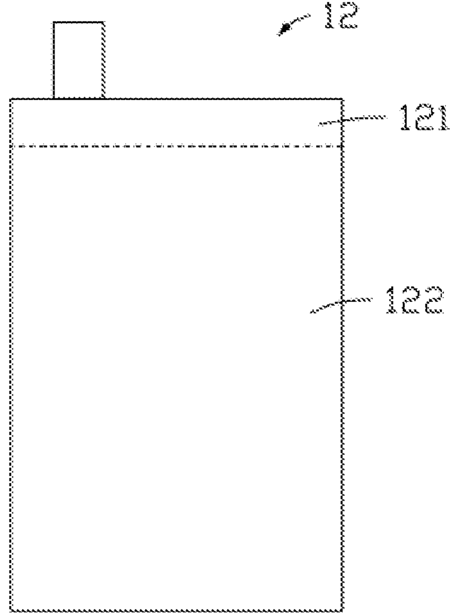
FIG. 4 is a schematic planar diagram of a first electrode plate of the electrochemical apparatus according to Embodiment 1 of this application.

As shown in FIG. 4, the second electrode plate 12 includes a third region 121 located at an end of the second electrode plate 12 and a fourth region 122 connected to the third region 121. A thickness of the third region 121 is less than a thickness of the fourth region 122. The third region 121 is disposed within the reusable region 19.

In an embodiment, at least part of the first electrode plate 11 and part of the second electrode plate 12 that are spaced apart compress each other in the thickness direction of the electrode assembly 10. Specifically, a plurality of first regions 111 and a plurality of third regions 121 compress each other in the thickness direction of the electrode assembly 10, which makes a gap between the first electrode plate 11 and second electrode plate 12 located within the reusable region 19 smaller, thereby achieving better interfacial contact, improved kinetics, and reduced risks of lithium precipitation.

Figure 6:
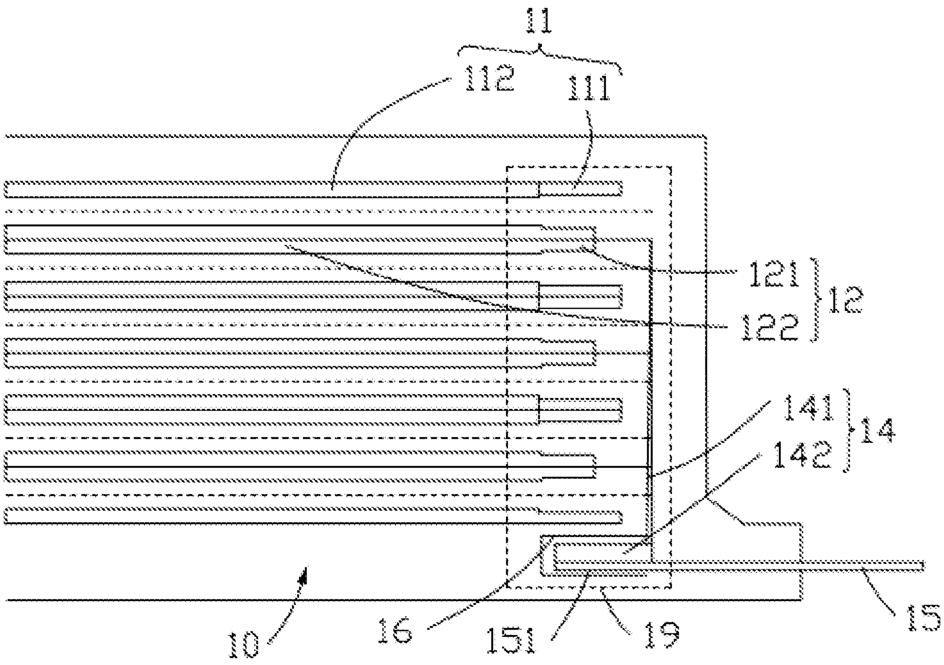
FIG. 6 is a schematic cross-sectional diagram of an electrode assembly of the electrochemical apparatus according to Embodiment 1 of this application.

As shown in FIG. 6, the second tab group 14 includes a second connecting portion 141 located at an end of the second electrode plate 12 and a second bending portion 142 connected to the second connecting portion 141 and located on a side face of the electrode assembly 10. The bending portion 142 is disposed within the reusable region 19.

In an embodiment, the second tab group 14 includes a plurality of second tabs, each of the second tabs may be formed by one current collector of the second electrode plate 12 extending outward, or the second tab may be formed by the third region 121 of the second electrode plate 12 extending toward a direction leaving the fourth region 122.

In an embodiment, the second tab group 14 is bent once and disposed on an end face of the electrode assembly 10 in the same direction, and this portion is the second connecting portion 141. The second tab group 14 extends along the end face of the electrode assembly 10 to the side face of the electrode assembly 10 and is bent toward the side face, and this portion is the second bending portion 142. In this application, the second tab group 14 only needs to be bent for a minimum of two times during arrangement. The times of bending the second tab group 14 are reduced, thereby avoiding possible fracture of the second tab group 14 caused by multiple times of bending, and improving reliability of the second tab group 14. In addition, the second bending portion 142 is located on the side face of the electrode assembly 10, which reduces the space occupied at the tab side of the electrode assembly 10 and increases the energy density.

In an embodiment, the first tab group 13 and the second tab group 14 may be located at the same end of the electrode assembly 10. In other embodiments, the first tab group 13 and the second tab group 14 may be located at two back-to-back ends of the electrode assembly 10 respectively.

In an embodiment, a length of the portion of the first electrode plate 11 disposed within the reusable region 19 is greater than a length of the portion of the second electrode plate 12 disposed within the reusable region 19, so that there is enough space for lithium deintercalated from the cathode during charging and discharging of the electrode assembly 10 to intercalate into the anode to further prevent lithium precipitation. Lengths of the portion of the first electrode plate 11 and the portion of the second electrode plate 12 that are disposed within the reusable region 19 are different, so that the first electrode plate 11 and the second electrode plate 12 can have a more compact structure during mutual compression, which further allows the reusable region 19 to have a larger volume to accommodate the larger first tab group 13 or second tab group 14 or other elements, thereby further improving space utilization.

In an embodiment, a width of the first region 111 is not less than a length of the first bending portion 132, and a width of the third region 121 is not less than a length of the second bending portion 142. The first tab group 13 and the second tab group 14 are disposed corresponding to the first area 111 and the third region 121 respectively, and neither a length of the portion of the first tab group 13 nor a length of the portion of the second tab group 14 that are disposed on the side face of the electrode assembly 10 exceeds a length of the side face of the electrode assembly 10 corresponding to the reusable region 19.

Figure 7:
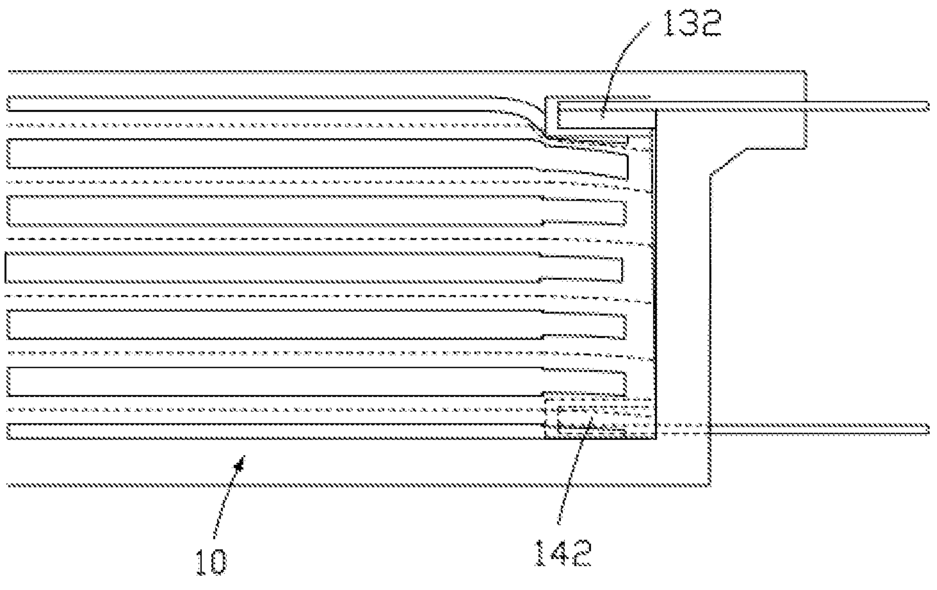
FIG. 7 is a schematic cross-sectional diagram of an electrode assembly, in a compressed state, of the electrochemical apparatus according to Embodiment 1 of this application.

As shown in FIG. 7, the first bending portion 132 and the second bending portion 142 compress toward the inside of the electrode assembly 10, so that the stacking of the first tab group 13 and the second tab group 14 through bending occupies no additional space, further increasing the energy density.

In an embodiment, in the thickness direction of the electrode assembly 10, a thickness of the first bending portion 132 is h1, a total thickness of the first regions 111 is h3, and a total thickness of the second regions 112 is h2, satisfying a relational expression: $h1 \le (h2-h3)$.

Further, a thickness of the second bending portion 142 is h6, a total thickness of the third regions 121 is h9, and a total thickness of the fourth regions 122 is h8, satisfying a relational expression: $h1+h4 \le (h2-h3)+(h8-h9)$.

The electrode assembly 10 further includes an adapting piece 15, a first end portion 151 of the adapting piece 15 is electrically connected to the first bending portion 132 to lead out signals. The first end portion 151 is not bent, which can further reduce a thickness of the electrochemical apparatus 1.

In an embodiment, the adapting piece 15 may be welded to the first tab group 13 and the second tab group 14 at one time, or the first tab group 13 and the second tab group 14 may be pre-welded to the adapting piece 15 and then welded again to the adapting piece 15 for fastening. This can prevent the electrode assembly 10 from being displaced due to movement during transportation or from being unevenly welded.

In an embodiment, the adapting piece 15 may be provided in a quantity of two. The first end portions 151 of the two adapting pieces 15 are electrically connected to the first bending portion 132 and the second bending portion 142 respectively. None of the first end portions 151 are bent. After being connected to the first tab group 13 or the second tab group 14, the adapting piece 15 extends toward the outside of the electrode assembly 10 for transmitting electrical signals of the electrode assembly 10. The first end portion 151 of the adapting piece 15 is disposed within the reusable region 19.

In an embodiment, a thickness of the first end portion 151 of the adapting piece 15 is h4 and the number of the first end portions 151 is n4, satisfying a relational expression: $h4 \times n4+h1 \le (h2-h3)$ or $h4 \times n4+h1+h4 \le (h2-h3)+(h8-h9)$.

An insulation layer 16 is disposed on surfaces of the first bending portion 132 and the first end portion 151. In an embodiment, the insulation layer 16 is disposed on at least one side of a welding place between the first end portion 151 and the first tab group 13 or the second tab group 14 to prevent electrolyte leakage caused by welding burrs piercing the packaging film outside the electrode assembly 10 or short circuit caused by welding burrs piercing the separator.

In an embodiment, an insulation layer 16 may also be disposed on an outer side of the first tab group 13 or the second tab group 14 to prevent short circuit of the first tab group 13 and the second tab group 14 caused by burrs piercing the separator during winding or lamination.

In an embodiment, a thickness of the portion of the insulation layer 16 located within the reusable region 19 is h5, satisfying a relational expression: $h5+h4 \times n4+h1 \le (h2-h3)$ or $h5+h4 \times n4+h1+h4 \le (h2-h3)+(h8-h9)$.

In an embodiment, the first bending portion 132 and the second bending portion 142 are located on two back-to-back side faces of the electrode assembly 10 respectively. Bending the first bending portion 132 and the second bending portion 142 toward two different directions can prevent the electrode assembly 10 from being short-circuited.

Embodiment 2

Figure 8:
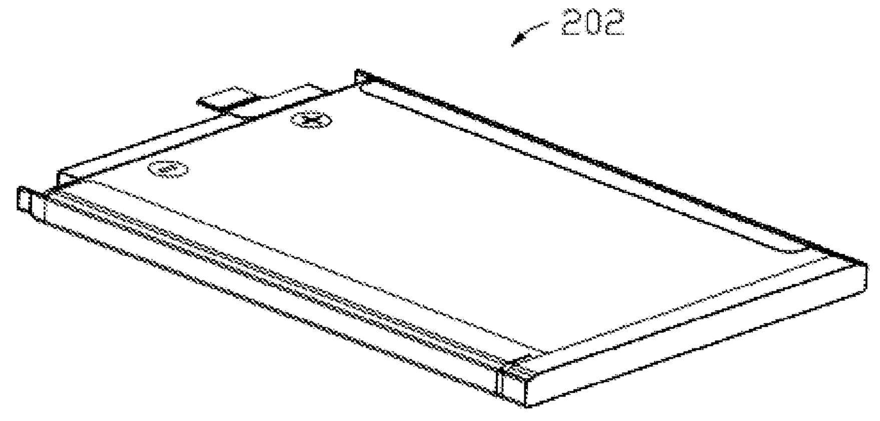
FIG. 8 is a stereoscopic schematic diagram of an electrochemical apparatus according to Embodiment 2 of this application.

FIG. 8 is a stereoscopic schematic diagram of an electrochemical apparatus 202 according to Embodiment 2 of this application. The electrochemical apparatus 202 includes an electrode assembly 20 (not shown in the figure). The electrochemical apparatus 202 is filled with an electrolyte (not shown in the figure) inside, and the electrolyte infiltrates the electrode assembly 20.

Figure 9:
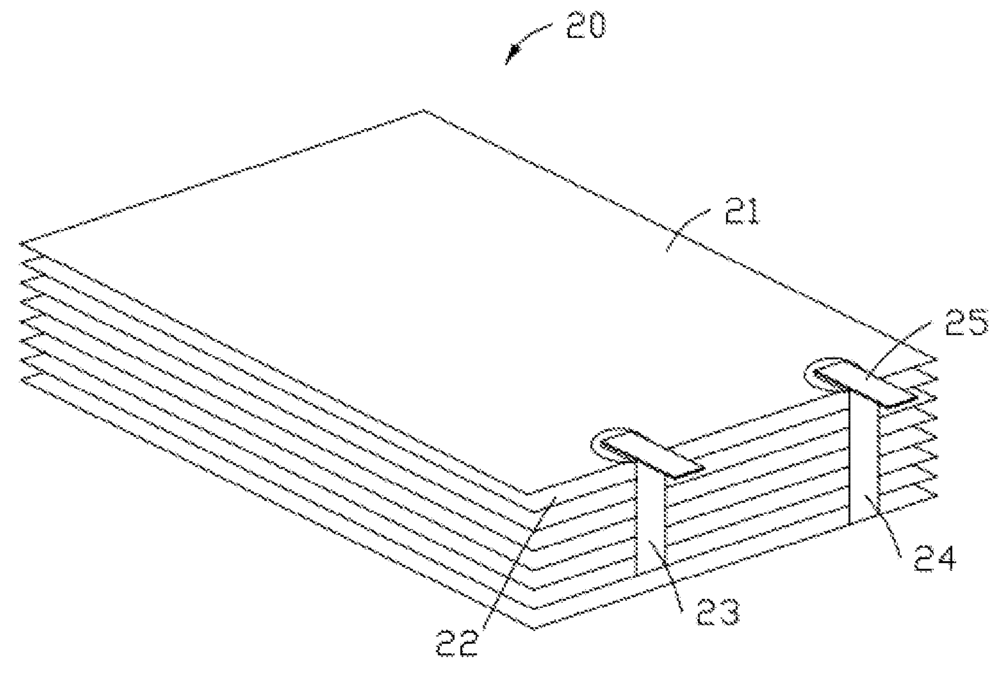
FIG. 9 is a stereoscopic schematic diagram of an electrode assembly of the electrochemical apparatus according to Embodiment 2 of this application.
Figure 10:
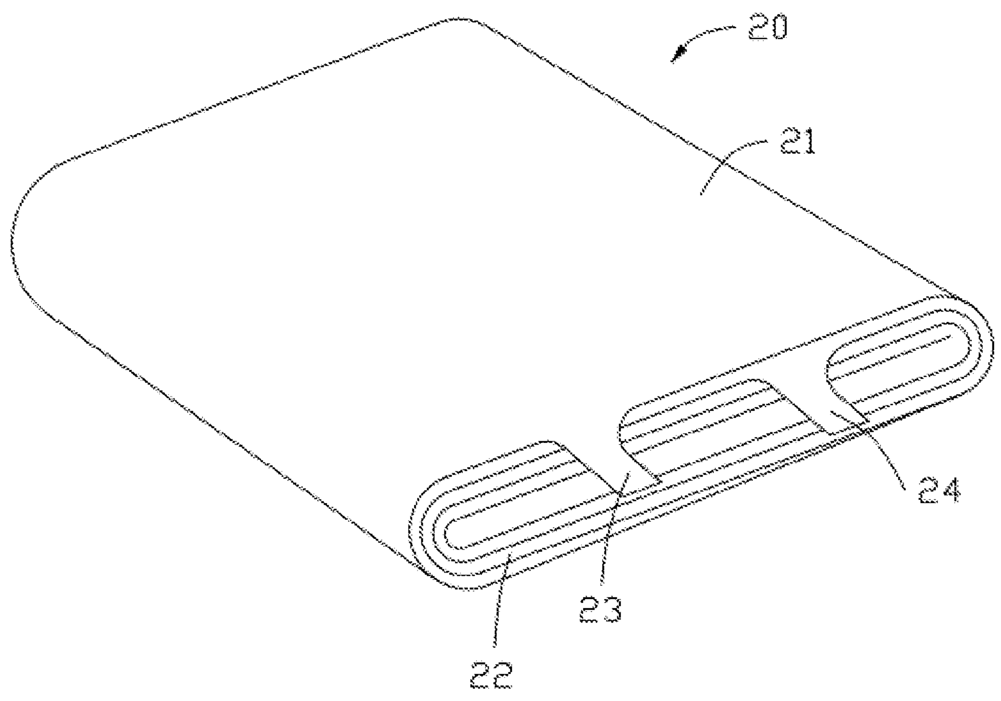
FIG. 10 is a stereoscopic schematic diagram of an electrode assembly of the electrochemical apparatus according to Embodiment 2 of this application.

FIG. 9 and FIG. 10 show an electrode assembly 20 according to Embodiment 2 of this application. The electrode assembly 20 includes a first electrode plate 21 and a first tab group 23 connected to the first electrode plate 21. The electrode assembly 20 may further include a plurality of first electrode plates 21 and at least a separator configured to separate the plurality of first electrode plates 21.

In an embodiment, as shown in FIG. 9, the electrode assembly 20 is a stacked electrode assembly, and a plurality of first electrode plates 21 are spaced apart and stacked. In an embodiment, as shown in FIG. 10, the electrode assembly 20 is a wound electrode assembly. The first electrode plate 21 is wound, and a tab is disposed every half turn or every turn, which may be adjusted according to an actual rate requirement.

Figure 12:
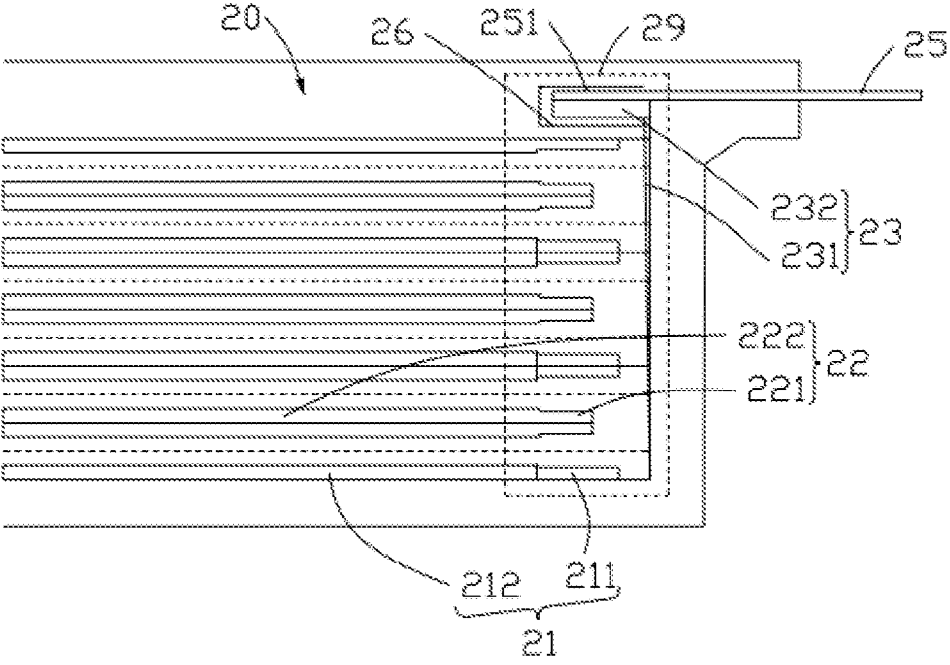
FIG. 12 is a schematic cross-sectional diagram of an electrode assembly of the electrochemical apparatus according to Embodiment 2 of this application.

As shown in FIG. 12, at least an end of the electrode assembly 20 includes a reusable region 29, and the reusable region 29 is disposed at an end of the electrode assembly 20. The reusable region 29 includes at least a region of the electrode assembly 20 in which thinned portions of the electrode plates are stacked. The thinned portion is a portion located at an end of the electrode plate and has a thickness less than the other portion of the electrode plate. Thickness of the thinned portion may gradually decrease or increase in a direction perpendicular to a thickness direction of the electrode plate.

It should be understood that, during preparation of electrode plate, when an active substance is applied, because most slurries are in liquid state and therefore have fluidity, places close to where tabs extend out are thinner due to a smaller amount of active substance.

The first electrode plate 21 includes a first region 211 located at an end of the first electrode plate 21 and a second region 212 connected to the first region 211, where a thickness of the first region 211 is less than a thickness of the second region 212, and the first region 211 is disposed within the reusable region 29. That is, the first region 111 is the thinned region.

In an embodiment, the first regions 211 of the first electrode plates 21 compress each other in a thickness direction of the electrode assembly 20, which makes gaps between the electrode plates located within the reusable region 29 smaller, thereby achieving better interfacial contact, improved kinetics, and reduced risks of lithium precipitation. The thickness direction is a direction of the smallest side of the electrochemical apparatus 202 or electrode assembly 20.

The first tab group 23 includes a first connecting portion 231 located at an end of the first electrode plate 21 and a first bending portion 232 connected to the first connecting portion 231 and located on a side face of the electrode assembly 20 (that is, the largest face of the electrode assembly 20). The first bending portion 232 is disposed within the reusable region 29.

In an embodiment, the first tab group 23 includes a plurality of first tabs, and each of the first tabs may be formed by one current collector of the first electrode plate 21 extending outward. To be specific, the first tab may be formed by the first region 211 of the first electrode plate 21 extending in a direction leaving the second region 212.

In an embodiment, the first tab group 23 is bent once and arranged on an end face of the electrode assembly 20 in the same direction, and this portion is the first connecting portion 231. The first tab group 23 extends along the end face of the electrode assembly 20 to the side face of the electrode assembly 20 and is bent toward the side face, and this portion is the first bending portion 232.

In this application, the first tab group 23 only needs to be bent for a minimum of two times during arrangement. The times of bending the first tab group 23 are reduced, thereby avoiding possible fracture of the first tab group 23 caused by multiple times of bending, and improving reliability of the first tab group 23. In addition, the first bending portion 232 is located on the side face of the electrode assembly 20, which reduces the space occupied at the tab side of the electrode assembly 20 and increases the energy density.

In an embodiment, the electrode assembly 20 further includes a second electrode plate 22 and a second tab group 24 connected to the second electrode plate 22. The electrode assembly 20 may further include a plurality of second electrode plates 22, each of the first electrode plates 21 is adjacent to one second electrode plate 22 without contact, each of the second electrode plates 22 is adjacent to one first electrode plate 21 without contact, and a separator may be sandwiched between one first electrode plate 21 and one second electrode plate 22.

Figure 11:
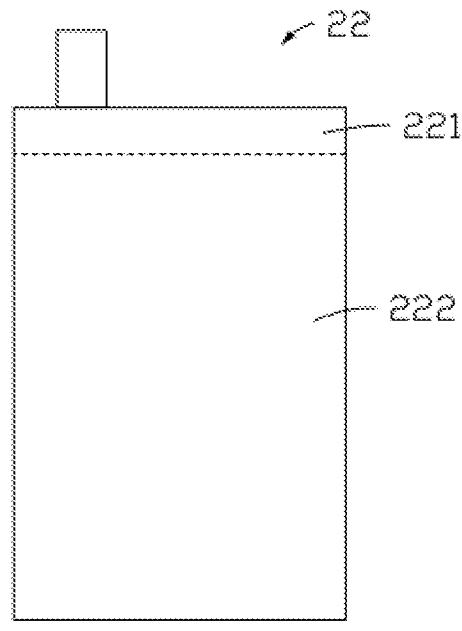
FIG. 11 is a schematic planar diagram of a first electrode plate of the electrochemical apparatus according to Embodiment 1 of this application.

As shown in FIG. 11, the second electrode plate 22 includes a third region 221 located at an end of the second electrode plate 22 and a fourth region 222 connected to the third region 221. A thickness of the third region 221 is less than a thickness of the fourth region 222. The third region 221 is disposed within the reusable region 29.

In an embodiment, at least part of the first electrode plate 21 and part of the second electrode plate 22 that are spaced apart compress each other in the thickness direction of the electrode assembly 20. Specifically, a plurality of first regions 211 and a plurality of third regions 221 compress each other in the thickness direction of the electrode assembly 20, which makes a gap between the first electrode plate 21 and second electrode plate 22 located within the reusable region 29 smaller, thereby achieving better interfacial contact, improved kinetics, and reduced risks of lithium precipitation. The thickness direction is a direction of the smallest side of the electrochemical apparatus 202 or electrode assembly 20.

Figure 13:
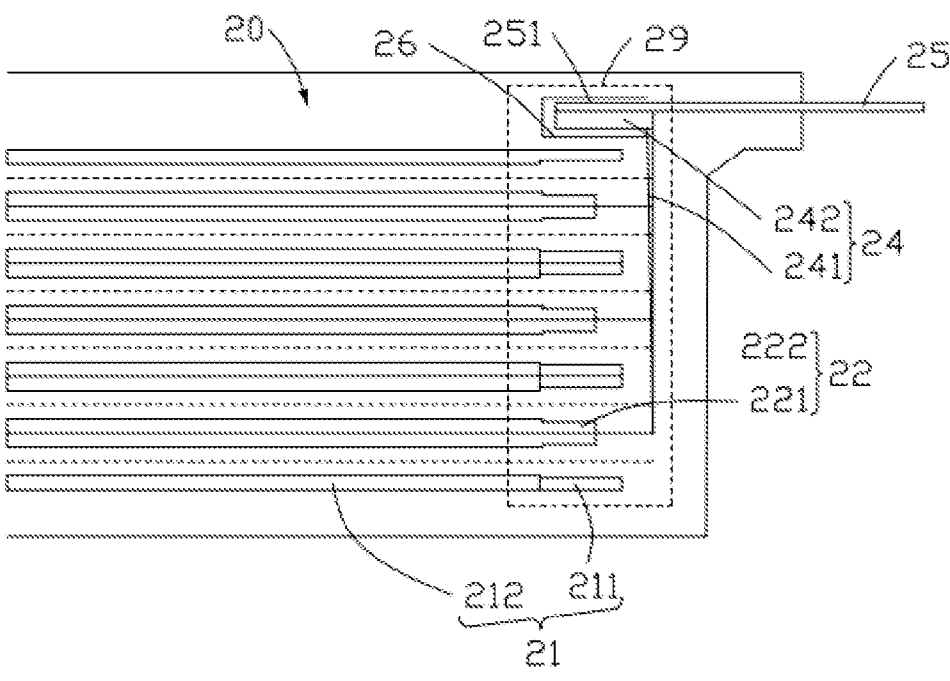
FIG. 13 is a schematic cross-sectional diagram of an electrode assembly of the electrochemical apparatus according to Embodiment 2 of this application.

As shown in FIG. 13, the second tab group 24 includes a second connecting portion 241 located at an end of the second electrode plate 22 and a second bending portion 242 connected to the second connecting portion 241 and located on a side face of the electrode assembly 20. The bending portion 242 is disposed within the reusable region 29.

In an embodiment, the second tab group 24 includes a plurality of second tabs, each of the second tabs may be formed by one current collector of the second electrode plate 22 extending outward, or the second tab may be formed by the third region 221 of the second electrode plate 22 extending toward a direction leaving the fourth region 222.

In an embodiment, the second tab group 24 is bent once and disposed on an end face of the electrode assembly 20 in the same direction, and this portion is the second connecting portion 241. The second tab group 24 extends along the end face of the electrode assembly 20 to the side face of the electrode assembly 20 and is bent toward the side face, and this portion is the second bending portion 242.

In this application, the second tab group 24 only needs to be bent for a minimum of two times during arrangement. The times of bending the second tab group 24 are reduced, thereby avoiding possible fracture of the second tab group 24 caused by multiple times of bending, and improving reliability of the second tab group 24. In addition, the second bending portion 242 is located on the side face of the electrode assembly 20, which reduces the space occupied at the tab side of the electrode assembly 20 and increases the energy density.

In an embodiment, the first tab group 23 and the second tab group 24 may be located at the same end of the electrode assembly 20. In other embodiments, the first tab group 23 and the second tab group 24 may be located at two back-to-back ends of the electrode assembly 20, respectively.

In an embodiment, a length of the portion of the first electrode plate 21 disposed within the reusable region 29 is greater than a length of the portion of the second electrode plate 22 disposed within the reusable region 29, so that there is enough space for lithium deintercalated from the cathode during charging and discharging of the electrode assembly 20 to intercalate into the anode to further prevent lithium precipitation. Lengths of the portion of the first electrode plate 21 and the portion of the second electrode plate 22 that are disposed within the reusable region 29 are different, so that the first electrode plate 21 and the second electrode plate 22 can have a more compact structure during mutual compression, which further allows the reusable region 29 to have a larger volume to accommodate the larger first tab group 23 or second tab group 24 or other elements, thereby further improving space utilization.

In an embodiment, a width of the first region 211 is not less than a length of the first bending portion 232, and a width of the third region 221 is not less than a length of the second bending portion 242. The first tab group 23 and the second tab group 24 are disposed corresponding to the first area 211 and the third region 221 respectively, and neither a length of the portion of the first tab group 23 nor a length of the portion of the second tab group 24 that are disposed on the side face of the electrode assembly 20 exceeds a length of the side face of the electrode assembly 20 corresponding to the reusable region 29.

Figure 14:
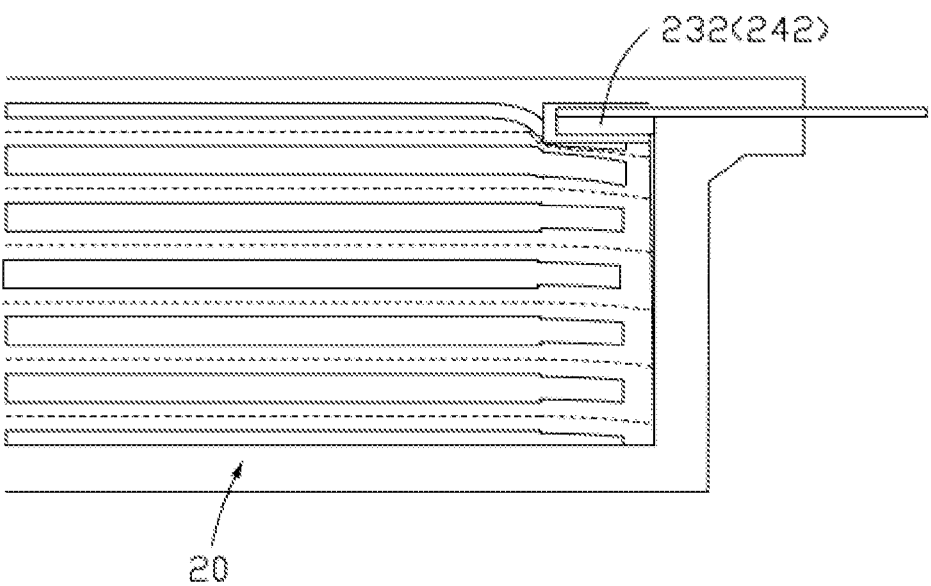
FIG. 14 is a schematic cross-sectional diagram of an electrode assembly, in a compressed state, of the electrochemical apparatus according to Embodiment 2 of this application.

As shown in FIG. 14, the first bending portion 232 and the second bending portion 242 compress toward the inside of the electrode assembly 20, so that the stacking of the first tab group 23 and the second tab group 24 through bending occupies no additional space, further increasing the energy density.

In an embodiment, in the thickness direction of the electrode assembly 20, a thickness of the first bending portion 232 is h1, a total thickness of the first regions 211 is h3, and a total thickness of the second regions 212 is h2, satisfying a relational expression: $h1 \leq (h2-h3)$.

Further, a thickness of the second bending portion 242 is h6, a total thickness of the third regions 221 is h9, and a total thickness of the fourth regions 222 is h8, satisfying a relational expression: $h1+h4 \leq (h2-h3)+(h8-h9)$.

The electrode assembly 20 further includes an adapting piece 25, a first end portion 251 of the adapting piece 25 is electrically connected to the first bending portion 232 for signal transmission. The first end portion 251 is not bent, which can further reduce a thickness of the electrochemical apparatus 2.

In an embodiment, the adapting piece 25 may be welded to the first tab group 23 and the second tab group 24 at one time, or the first tab group 23 and the second tab group 24 may be pre-welded to the adapting piece 25 and then welded again to the adapting piece 25 for fastening. This can prevent the electrode assembly 20 from being displaced due to movement during transportation or from being unevenly welded.

In an embodiment, the adapting piece 25 may be provided in a quantity of two. The first end portions 251 of the two adapting pieces 25 are electrically connected to the first bending portion 232 and the second bending portion 242 respectively. None of the first end portions 251 are bent. After being connected to the first tab group 23 or the second tab group 24, the adapting piece 25 extends toward the outside of the electrode assembly 20 for transmitting electrical signals of the electrode assembly 20. The first end portion 251 of the adapting piece 25 is disposed within the reusable region 29.

In an embodiment, a thickness of the first end portion 251 of the adapting piece 25 is h4 and the number of the first end portions 251 is n4, satisfying a relational expression: $h4 \times n4+h1 \leq (h2-h3)$ or $h4 \times n4+h1+h4 \leq (h2-h3)+(h8-h9)$.

An insulation layer 26 is disposed on surfaces of the first bending portion 232 and the first end portion 251. In an embodiment, the insulation layer 26 is disposed on at least one side of a welding place between the first end portion 251 and the first tab group 23 or the second tab group 24 to prevent electrolyte leakage caused by welding burrs piercing the packaging film outside the electrode assembly 20 or short circuit caused by welding burrs piercing the separator.

In an embodiment, the insulation layer 26 may be disposed on an outer side of the first tab group 23 or the second tab group 24 to prevent short circuit of the first tab group 23 and the second tab group 24 caused by burrs piercing the separator during winding or lamination.

In an embodiment, a thickness of the portion of the insulation layer 26 located within the reusable region 29 is h5, satisfying a relational expression: $h5+h4 \times n4+h1 \leq (h2-h3)$ or $h5+h4 \times n4+h1+h4 \leq (h2-h3)+(h8-h9)$.

In an embodiment, the first bending portion 232 and the second bending portion 242 are disposed on the same side of the electrode assembly 10, and the first bending portion 232 and the second bending portion 242 are spaced apart with insulation. Disposing the first bending portion 232 and the second bending portion 242 on the same side of the electrode assembly 20, which can simplify the bending process and increase yield during the overall preparation process, and can also make the first electrode plate 21 and the second electrode plate 22 compress toward a same side of the electrode assembly 20 so that the reusable region 29 has a larger space for accommodating the first bending portion 232 and the second bending portion 242, further improving the space utilization and energy density.

Embodiment 3

Figure 15:
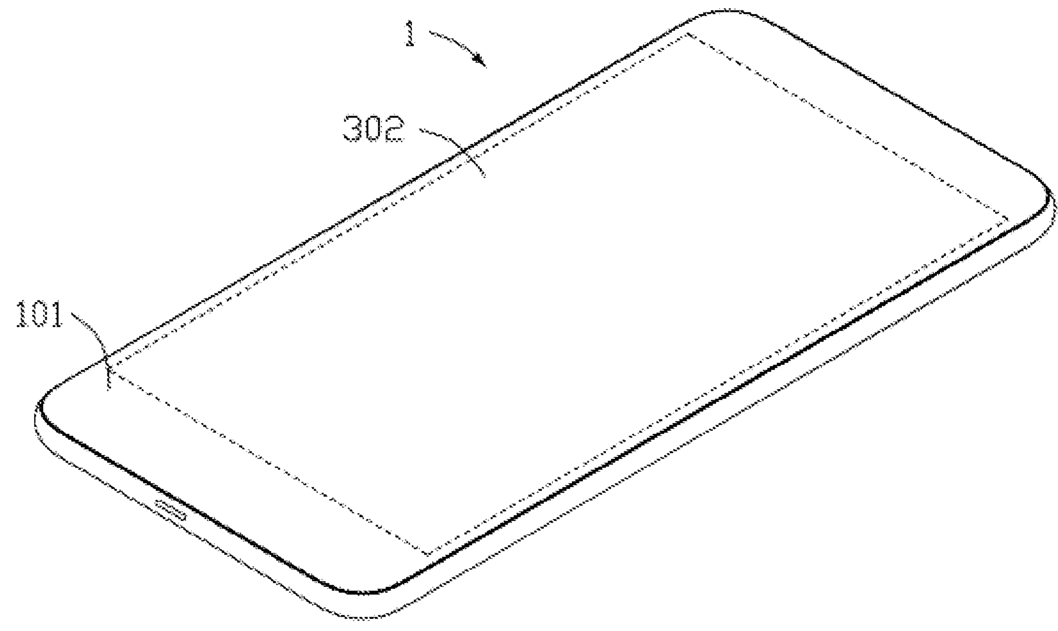
FIG. 15 is a stereoscopic schematic diagram of an electronic apparatus according to Embodiment 3 of this application.

FIG. 15 is a stereoscopic schematic diagram of an electronic apparatus 1 according to Embodiment 3 of this application.

This application further provides an electronic apparatus 1. The electronic apparatus includes a body 101 and an electrochemical apparatus 302 disposed inside the body 101. The electrochemical apparatus 302 may be the electrochemical apparatus according to Embodiment 1 or Embodiment 2.

In FIG. 13, a mobile phone is merely used as an example of the electronic apparatus 1. In other embodiments, the electronic apparatus 1 may alternatively be a wearable device, an unmanned aerial vehicle, a personal computer, a smart home appliance, an industrial controller, an energy storage apparatus, an electric tool, an electric vehicle, or the like.

The foregoing describes specific embodiments of this application with reference to the accompanying drawings. However, persons of ordinary skill in the art can understand that various changes and replacements can be further made to the embodiments of this application without departing from the spirit and the scope of this application. These changes and replacements fall within the scope of this application.

What is claimed is:

1. An electrochemical apparatus, comprising an electrode assembly, wherein the electrode assembly comprises a first electrode plate and a first tab group electrically connected to the first electrode plate, wherein an end of the electrode assembly comprises a reusable region;

the first electrode plate comprises a first region located at an end of the first electrode plate and a second region connected to the first region, wherein a thickness of the first region is less than a thickness of the second region, and the first region is disposed within the reusable region; and the first tab group comprises a first connecting portion located at an end of a first tab and a first bending portion connected to the first connecting portion and located on a side face of the electrode assembly, wherein the first bending portion is disposed within the reusable region.

2. The electrochemical apparatus according to claim 1, wherein the electrode assembly further comprises a second electrode plate and a second tab group electrically connected to the second electrode plate;

the second electrode plate comprises a third region located at an end of the second electrode plate and a fourth region connected to the third region, a thickness of the third region is less than a thickness of the fourth region, and the third region is disposed within the reusable region; and the second tab group comprises a second connecting portion located at an end of a second tab and a second bending portion connected to the second connecting portion and located on a side face of the electrode assembly, wherein the second bending portion is disposed within the reusable region.

3. The electrochemical apparatus according to claim 2, wherein the first bending portion and the second bending portion are located on two opposite side faces of the electrode assembly respectively.

4. The electrochemical apparatus according to claim 2, wherein a length of the portion of the first electrode plate disposed within the reusable region is greater than a length of the portion of the second electrode plate disposed within the reusable region.

5. The electrochemical apparatus according to claim 1, wherein a width of the first region is not less than a length of the first bending portion.

6. The electrochemical apparatus according to claim 1, wherein in a thickness direction of the electrochemical apparatus, a thickness of the first bending portion is h1, a total thickness of the first regions is h3, and a total thickness of the second regions is h2, and $h1 \leq (h2-h3)$.

7. The electrochemical apparatus according to claim 6, further comprising an adapting piece, wherein a first end portion of the adapting piece is electrically connected to the first bending portion, and the first end portion is not bent.

8. The electrochemical apparatus according to claim 7, wherein an insulation layer is disposed on surfaces of the first bending portion and the first end portion.

9. The electrochemical apparatus according to claim 7, wherein a thickness of the first end portion is h4, and the number of the first end portions is n4, and $h4 \times n4 + h1 \leq (h2-h3)$.

10. An electronic apparatus, comprising an electrochemical apparatus, the electrochemical apparatus comprising an electrode assembly, wherein the electrode assembly comprises a first electrode plate and a first tab group electrically connected to the first electrode plate, wherein an end of the electrode assembly comprises a reusable region;

the first electrode plate comprises a first region located at an end of the first electrode plate and a second region connected to the first region, wherein a thickness of the first region is less than a thickness of the second region, and the first region is disposed within the reusable region; and the first tab group comprises a first connecting portion located at an end of a first tab and a first bending portion connected to the first connecting portion and located on a side face of the electrode assembly, wherein the first bending portion is disposed within the reusable region.

11. The electronic apparatus according to claim 10, wherein the electrode assembly further comprises a second electrode plate and a second tab group electrically connected to the second electrode plate;

the second electrode plate comprises a third region located at an end of the second electrode plate and a fourth region connected to the third region, a thickness of the third region is less than a thickness of the fourth region, and the third region is disposed within the reusable region; and the second tab group comprises a second connecting portion located at an end of a second tab and a second bending portion connected to the second connecting portion and located on a side face of the electrode assembly, wherein the second bending portion is disposed within the reusable region.

12. The electronic apparatus according to claim 11, wherein the first bending portion and the second bending portion are located on two opposite side faces of the electrode assembly respectively.

13. The electronic apparatus according to claim 11, wherein a length of the portion of the first electrode plate disposed within the reusable region is greater than a length of the portion of the second electrode plate disposed within the reusable region.

14. The electronic apparatus according to claim 10, wherein a width of the first region is not less than a length of the first bending portion.

15. The electronic apparatus according to claim 10, wherein in a thickness direction of the electrochemical apparatus, a thickness of the first bending portion is h1, a total thickness of the first regions is h3, and a total thickness of the second regions is h2, and $h1 \leq (h2-h3)$.

16. The electronic apparatus according to claim 15, wherein the electrochemical apparatus further comprising an adapting piece, wherein a first end portion of the adapting piece is electrically connected to the first bending portion, and the first end portion is not bent.

17. The electronic apparatus according to claim 16, wherein an insulation layer is disposed on surfaces of the first bending portion and the first end portion.

18. The electronic apparatus according to claim 16, wherein a thickness of the first end portion is h4, and the number of the first end portions is n4, and $h4 \times n4 + h1 \leq (h2-h3)$.

19. The electrochemical apparatus according to claim 1, wherein the first region of the first electrode plate located on the side face of the electrode assembly is bent toward the inside of the electrode assembly.

* * * * *